(12) United States Patent
Fujinami et al.

(10) Patent No.: US 7,745,061 B2
(45) Date of Patent: Jun. 29, 2010

(54) ELECTROLYTE MEMBRANE FOR FUEL CELL HAVING HOLLOW INORGANIC FINE PARTICLES

(75) Inventors: Tatsuo Fujinami, Hamamatsu (JP); Takuya Mase, Hamamatsu (JP); Masayoshi Takami, Hamamatsu (JP)

(73) Assignees: National University Corporation Shizuoka University, Shizuoka-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/265,828

(22) Filed: Nov. 6, 2008

(65) Prior Publication Data

US 2009/0117439 A1 May 7, 2009

(30) Foreign Application Priority Data

Nov. 7, 2007 (JP) ............................. 2007-289844

(51) Int. Cl.
*H01M 8/10* (2006.01)

(52) U.S. Cl. .................. 429/492; 429/491; 429/495
(58) Field of Classification Search .................. 429/30, 429/33, 46
See application file for complete search history.

(56) References Cited

U.S. PATENT DOCUMENTS

| 2003/0099874 A1* | 5/2003 | Kim et al. ...................... 429/33 |
| 2004/0029015 A1* | 2/2004 | Inagaki et al. ............... 429/317 |
| 2005/0053822 A1* | 3/2005 | Miyake et al. ................ 429/33 |
| 2007/0020499 A1* | 1/2007 | Suzuki et al. ................. 429/33 |

FOREIGN PATENT DOCUMENTS

JP 2002-289051 A 10/2002

* cited by examiner

*Primary Examiner*—Dah-Wei D Yuan
*Assistant Examiner*—Stephan Essex
(74) *Attorney, Agent, or Firm*—Kenyon & Kenyon LLP

(57) ABSTRACT

An electrolyte membrane for a fuel cell includes: a proton conductive material in which hollow inorganic fine particles having through-holes on the surface of the hollow inorganic fine particles, are filled with an electrolyte resin; and a non-proton conductive polymer.

16 Claims, 2 Drawing Sheets

ELECTROLYTE MEMBRANE FOR FUEL CELL HAVING HOLLOW INORGANIC FINE PARTICLES

INCORPORATION BY REFERENCE

The disclosure of Japanese Patent Application No. 2007-289844 filed on Nov. 7, 2007 including the specification drawings and abstract is incorporated herein by dereference in its entirety.

BACKGROUND OF THE INVENTION

1. Field of the Invention

The present invention relates to an electrolyte membrane for a fuel cell.

2. Description of the Related Art

Fuel cells directly convert chemical energy into electric energy by supplying a fuel and an oxidizing agent to two electrodes that are electrically connected and electrochemically inducing oxidation of the fuel. By contrast with thermal power generation, fuel cells are not affected by the limitations of Carnot cycle and, therefore, demonstrate a high energy conversion efficiency. A fuel cell is usually configured by stacking a plurality of unit cells containing as a basic structure a membrane-electrode assembly (MEA) in which an electrolyte membrane is sandwiched between a pair of electrodes. Among such fuel cells, fuel cells of a solid polymer electrolyte type (PEFC) that use a solid polymer electrolyte membrane as the electrolyte membrane attracted attention as power sources, in particular, for portable devices and movable bodies, because such fuel cells have a number of advantages including the easiness of miniaturization and operability at a low temperature.

In a fuel cell of a solid polymer electrolyte type, when hydrogen is used as a fuel, a reaction represented by Equation (1) below proceeds at an anode (fuel electrode).

$$H_2 \rightarrow 2H^+ + 2e^- \quad (1)$$

Electrons generated according to Equation (1) perform a work in an external load via an external circuit and then reach a cathode (oxidizing agent electrode). Protons generated according to Equation (1) move by electro osmosis from the anode to the cathode inside the solid polymer electrolyte membrane in a state of hydration with water.

Further, when oxygen is used as an oxidizing agent, a reaction represented by Equation (2) below proceeds at the cathode.

$$2H^+ + (\tfrac{1}{2})O_2 + 2e^- \rightarrow H_2O \quad (2)$$

Water generated at the cathode mainly passes through a gas diffusion layer and is discharged to the outside. Thus, fuel cells are clean power generating devices producing no wastes other than water.

A polymer electrolyte membrane that can operate in a temperature range of fuel cells of a solid polymer electrolyte membrane type that are usually used is composed of a proton conductive material of an organic polymer type that has a polymer in a basic skeleton or main chain. Dimensional changes such as expansion and contraction of the membrane during water absorption and desorption and the occurrence of heat-induced creep or thermal shrinkage is a problem associated with such polymer conductive materials. In the operation environment of fuel cells, the water and heat balance is known to change frequently due to a load or external environment, and dimensional changes of the membrane caused by such changes can shorten the electrolyte service life. This is one more very serious problem associated with the presently available polymer conductive materials of an organic polymer type.

On the other hand, an electrolyte membrane combining an inorganic proton conductor and a non-proton conductive polymer has been suggested, this electrolyte membrane being different from the above-described electrolyte membrane using a proton conductive material of an organic polymer type. Japanese Patent Application Publication No. 2002-289051 (JP-A-2002-289051) disclosed a proton conductive membrane including a metal oxide hydrate represented by a tungsten oxide hydrate or a tin oxide hydrate and a non-proton conductive polymer in order to maintain stable proton conductivity and mechanical strength even at a temperature equal to or greater than 100° C., which is heat resistance limit of fluorine-containing electrolyte membranes.

The proton conductive membrane disclosed in JP-A-2002-289051 has stable proton conductivity at a high temperature and under low-humidity conditions when used as an electrolyte membrane for a fuel cell. However, as compared with Nafion, which is an organic polymer of related art, the proton conductivity value is by itself insufficient under operation conditions (temperature, humidity) at which the power generation efficiency is the best for a fuel cell. Further, the invention of JP-A-2002-289051 is not concerned with dimensional stability of electrolyte membranes.

SUMMARY OF THE INVENTION

The present invention provides an electrolyte membrane in which dimensional changes caused by water and heat balance variations are inhibited by mixing a proton conductive material that maintains proton conduction capacity, without losing mechanical properties and shape.

The electrolyte membrane for a fuel cell according to the embodiment includes a proton conductive material in which hollow inorganic fine particles having through-holes on the surface thereof are filled with an electrolyte resin and a non-proton conductive polymer.

In the electrolyte membrane for a fuel cell of such a configuration, in the proton conductive material contained in the electrolyte membrane, a very large number of proton conductive groups as the end groups of the electrolyte resin filled up into the cavities of the inorganic fine particles serving as outer shells of the proton conductive material are exposed from the through-holes being located on the surface of inorganic fine particles, thereby ensuring high proton conductivity. Furthermore, because the electrolyte resin is confined in inorganic fine particles of fixed particle size, no swelling or contraction of the proton conductive material occurs. Therefore, in the electrolyte membrane, dimensional changes caused by water and heat balance are inhibited. In addition, even when a state with a high flowability is assumed such that normally occurs where a large number of proton conductive groups are introduced into the electrolyte resin structure, because the electrolyte resin is retained in the cavities of inorganic fine particles according to the embodiment, both the shape retention ability and proton conductivity of the proton conductive material are increased. Furthermore, by using a non-proton conductive polymer that demonstrates no water-induced swelling or contraction as a binder resin for film formation, dimensional changes caused by water and heat balance can be inhibited even more effectively. Because the non-proton conductive polymer is not limited to a specific polymer, the degree of freedom in polymer selection is high and a polymer of an appropriate type can be selected, thereby making it possible to obtain an optimum electrolyte membrane according to the application and object of fuel cell.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF EMBODIMENTS

Figure 1:
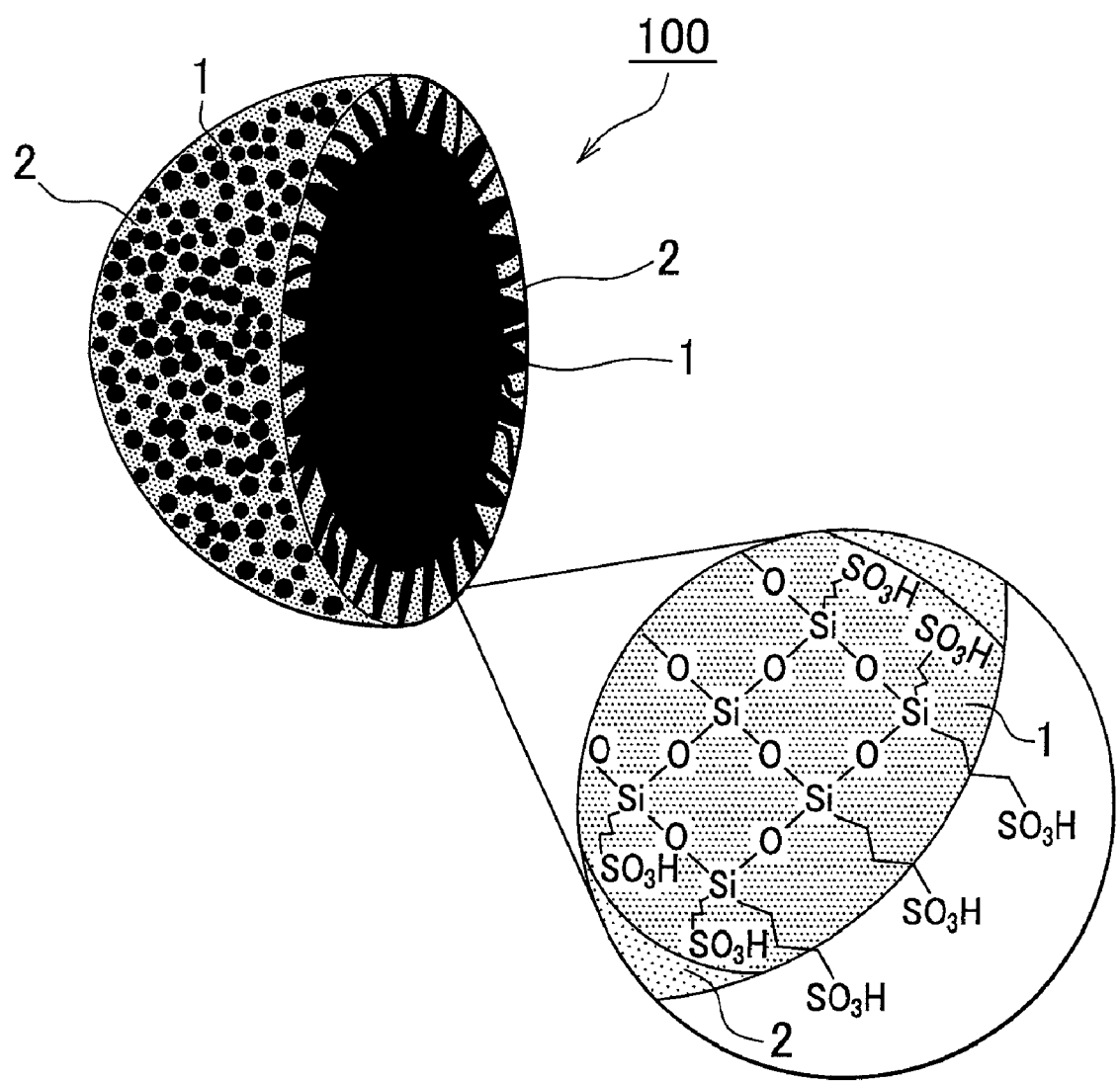
FIG. 1 is a cross-sectional view of a powdered proton conductive material illustrating schematically a proton conductive material of the embodiment.

The proton conductive material according to the embodiment will be described below in greater detail with reference to the appended drawings. FIG. 1 is a cross-sectional view of a powdered proton conductive material illustrating schematically a proton conductive material of the embodiment. An enlarged drawing of a cross-section that illustrates schematically a structural formula of the electrolyte resin is shown in the circle in the lower right portion of the figure. Broken lines connecting silicon atoms and sulfonic acid groups (—SO₃H) in the circle in the lower right portion of the figure represent alkyl chains. A proton conductive material 100 includes an electrolyte resin 1 and inorganic fine particles 2, and the hollow inorganic fine particles 2 are filled with the electrolyte resin 1. The inorganic fine particles 2 have a large number of through-holes, and the electrolyte resin 1 is exposed via the through-holes on the surface of the inorganic fine particles.

As indicated by a structural formula that is shown schematically in the circle in the lower right portion of FIG. 1, the electrolyte resin 1 has a Si—O skeleton. The electrolyte resin 1 has proton conductive groups such as sulfonic acid groups. As shown in the circle in the lower right portion of FIG. 1, the sulfonic acid groups are exposed on the surface of the proton conductive material 100 via the through-holes of the inorganic fine particles 2.

A polymer in which a Si—O skeleton is formed, for example, by polymerization of a monomer can be used as the electrolyte resin having a Si—O skeleton. With such a polymer, the polymerization reaction can be easily induced when the electrolyte resin is synthesized by filling up the monomer as raw materials for the electrolyte resin into the inorganic fine particles and polymerizing. Further, the monomer has high affinity for the inorganic fine particles and can be easily filled up. Therefore, the proton conductive material can be synthesized at a high rate. In addition, because the electrolyte resin has a strong polymer chain such as a Si—O skeleton, the proton conductive groups do not leak to the outside of the proton conductive material. The polymerization of a monomer as referred to herein includes addition polymerization and polycondensation. A resin that is a polymer having a high molecular weight from the very beginning cannot be used because such resin is difficult to load under a reduced pressure. Therefore, a monomer can be used for filling up.

A compound that becomes a repeating unit of the electrolyte resin that has to be filled up into the cavities of hollow inorganic fine particles is used as the monomer. For example, when perfluorocarbonsulfonic acid that has been used in the field of solid polymer fuel cells is to be filled up into the inorganic fine particles, a monomer forming a fluorocarbon skeleton such as fluoroethylene can be used. When an electrolyte resin having a Si—O skeleton is to be filled up into the inorganic fine particles, a hydrocarbonoxysilane compound and/or a silanol compound having a sulfonic acid group or a precursor group thereof can be used. The suitable hydrocarbonoxysilane compound as referred to herein is a compound having a structure in which a sulfonic acid group or a precursor group thereof is directly or indirectly bound to a silicon atom, and a hydrocarbonoxy group that may contain a dissimilar atom is bound to the same silicon atom. The hydrocarbonoxy group as referred to herein is a group having a structure in which an oxygen atom is bound to an aliphatic or aromatic hydrocarbon group, for example, an alkoxy group or an aryloxy group, wherein the oxygen atom is bound to a silicon atom. The hydrocarbonoxy group may contain a dissimilar atom. When a sulfonic acid group or a precursor group thereof is indirectly bound to a silicon atom, it may be bound, for example, via an aliphatic or aromatic hydrocarbon group, and the hydrocarbon group may contain a dissimilar atom. Further, the suitable silanol compound as referred to herein is a compound having a structure in which a sulfonic acid group or a precursor group thereof is directly or indirectly bound to a silicon atom, and a hydroxyl group is bound to the same silicon atom. For example, a silicon compound in which a sulfonic acid hydrocarbon group (may contain a dissimilar atom) and a hydroxyl group (—OH) and/or an alkoxy group or an aryloxy group (may contain a dissimilar atom) are bound to a Si atom can be used as the hydrocarbonoxysilane compound and/or the silanol compound. More specific examples include compounds having a structure represented by Formula (1), Formula (2), and Formula (3) below.

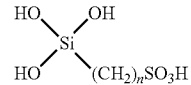

Formula (1)

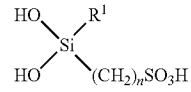

Formula (2)

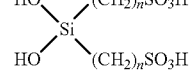

Formula (3)

(wherein, R¹ is an aliphatic hydrocarbon group having 1 to 4 carbon atoms or an aromatic hydrocarbon group having 6 to 10 carbon atoms; n=1 to 4).

A compound from which the above-described monomer having a sulfonic acid group can be derived can be used as the monomer having a precursor group of a sulfonic acid group. Examples of monomers corresponding to the Formula (1), Formula (2), and Formula (3) above include monomers having structures represented by Formula (4), Formula (5), and Formula (6) below.

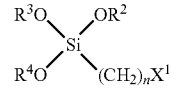

Formula (4)

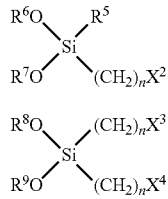

Formula (5)

Formula (6)

(wherein, $R^2$ to $R^9$ are, independently from each other, a hydrogen atom or a functional group selected from aliphatic hydrocarbon groups, for example having 1 to 4 carbon atoms, that may contain a dissimilar atom, and aromatic hydrocarbon groups, for example having 6 to 10 carbon atoms, that may contain a dissimilar atom. Further, n=1 to 4. $X^1$ to $X^4$ are, independently from each other, a functional group selected from precursor groups of sulfonic acid groups, such as a thiol group, a sulfynyl group, a sulfonic acid fluoride, a sulfonic acid chloride, a sulfonic acid bromide, a sulfonic acid iodide, a lithium sulfonate, a potassium sulfonate, and a sodium sulfonate).

Monomers of two or more kinds may be used when the electrolyte resin is synthesized.

For example, when the precursor group of sulfonic acid group is a thiol group or a sulfynyl group, the precursor group can be converted into the sulfonic acid group by adding an oxidizing agent such as hydrogen peroxide solution. Alternatively, when the precursor group is a sulfonic acid fluoride, a sulfonic acid chloride, a sulfonic acid bromide, a sulfonic acid iodide, a lithium sulfonate, a potassium sulfonate, and a sodium sulfonate, the precursor group can be converted into the sulfonic acid group by adding an acid such as hydrochloric acid or sulfuric acid, or by adding a base such as an aqueous solution of sodium hydroxide. Further, the precursor groups of the sulfonic acid group are not limited to those described above, and also include the compounds in which $X^1$ to $X^4$ in Formulas (4) to (6) above are end olefins. In this case, the precursor groups of the sulfonic acid group can be converted into alkyl groups having terminally-attached sulfonic acid group by performing base treatment after sulfur trioxide treatment.

The electrolyte resin 1 can also use polymer electrolytes that are usually used in fuel cells. The polymer electrolytes as referred to herein include fluoropolymer electrolytes such as perfluorocarbonsulfonic acid resins represented by Nafion® (trade mark of DuPont) and also hydrocarbon-based polymer electrolytes in which a protonic acid group (proton conductive group) such as a sulfonic acid group, a carbonic acid group, a phosphoric acid group, and a boronic acid group is introduced in hydrocarbon-based polymers, for examples, engineering plastics such as polyetheretherketones, polyetherketones, polyethersulfones, polyphenylene sulfide, polyphenylene ethers, polyparaphenylene, and plastics for general applications such as polyethylene, polypropylene, and polystyrene.

It is required to ensure a sufficient packing amount inside the inorganic fine particles 2. Also, the inorganic fine particles 2 is required to have a small internal resistance with respect to the flow of a monomer to be easy to fill up the monomer when the monomer serving as raw materials for the electrolyte resin 1 is filled up. The inorganic fine particles are not limited to perfect hollow bodies and may also have an internal structure containing columns of having partitions. However, where the internal structure is a porous structure with excessive compactness, the aforementioned requirements cannot be met. Therefore, such compact porous bodies are not included.

Further, the through-holes that are present in the surface of the inorganic fine particles 2 are required to have a small resistance with respect to the flow of a monomer to be easy to fill up the monomer when the monomer serving as raw materials for the electrolyte resin 1 is filled up. Further, the through-holes are also required to have a size within an adequate range such that the electrolyte resin produced by addition polymerization or polycondensation of the monomer inside the particle does not flow out of the particle.

In order to satisfy the above-described requirements relating to the inside of the inorganic fine particles 2 and properties of through-holes, the inorganic fine particles 2 according to the embodiment are preferably from $SiO_2$. Another advantage is that the proton conductive material 100 excels in mechanical properties due to a rigid shell provided by $SiO_2$.

Microcapsules (e.g., Washin-microcapsules produced by Washin Chemical Industry Co., Ltd.) containing $SiO_2$ as the main component are preferably used as the inorganic fine particles, but other porous hollow bodies in the form of inorganic fine particles may be also used. Examples of suitable materials other than $SiO_2$ include silsesquioxanes and zeolites. However, mesoporous silica is not suitable for hollow inorganic fine particles used according to the embodiment because the electrolyte resin easily flows out from inside the particles and the electrolyte resin is difficult to retain. As a method for manufacturing the inorganic fine particles, a styrene monomer is polymerized in the presence of a vinyl monomer having a cation surfactant group and polystyrene fine particles having ionic groups on the surface are obtained. Silica is formed on the surface of the polystyrene fine particle surface by conducting a hydrolysis condensation reaction of tetraethoxysilane with the polystyrene fine particles. Hollow silica microcapsules are then obtained by dissolving and removing polystyrene with a solvent. Prior to manufacturing the proton conductive material, the microcapsules have to be treated with hydrochloric acid to remove impurities in advance.

The proton conductive material 100 preferably has an ion exchange capacity greater than the inorganic fine particles 2 themselves, and the ion exchange capacity of the proton conductive material 100 is preferably equal to or greater than 0.5 milliequivalent per gram. Where the ion exchange capacity of the proton conductive material 100 is lower than the ion exchange capacity of the inorganic fine particles 2, the ion conduction capacity cannot be expected to increase even by adding ion conductive groups. Further, where the ion exchange capacity of the proton conductive material 100 is less than 0.5 milliequivalent per gram, when the proton conductive material 100 is used for an electrolyte membrane of a fuel cell, sufficient power generation efficiency sometimes cannot be expected. Therefore, with the proton conductive material having the above-described ion exchange capacity, by filling up the electrolyte resin into the inorganic fine particles, it is possible to ensure a proton conduction capacity equal to or greater than that of the inorganic fine particles, and when the proton conductive material is used in an electrolyte membrane of a fuel cell, a sufficient proton conduction capacity can be demonstrated.

Further, the average particle size of the proton conductive material 100 is preferably 0.05 to 10 µm. Where the average particle size of the proton conductive material 100 is less than 0.05 µm, the size is sometimes insufficient to retain a sufficient amount of filled up electrolyte resin. Conversely, where the average particle size of the proton conductive material 100 exceeds 10 µm, the particles sometimes cannot be used in an electrolyte membrane of adequate thickness. From the standpoint of avoiding the particle fracture, it is even more preferred that the bulk density of the inorganic fine particles 2 be equal to or greater than 5% the true density of the inorganic fine particles 2.

In addition to the above-described proton conductive material, the electrolyte membrane for a fuel cell according to the embodiment includes a non-proton conductive polymer that has no proton conductive groups. Because the non-proton conductive polymer is not limited to any specific polymer, the degree of freedom in polymer selection is high. By appropriately selecting the non-proton conductive polymer according to the application and object of the fuel cell, it is possible to obtain an optimum electrolyte membrane. Examples of suitable polymers include hydrocarbon-based polymers such as engineering plastics, for example, polyetheretherketones, polyetherketones, polyethersulfones, polyphenylene sulfide, polyphenylene ether, and polyparaphenylene, and plastics for general applications such as polyethylene, polypropylene, polystyrene, acrylonitrile-butadiene-styrene copolymer (ABS), methacrylic resin (PMMA), and polyvinyl chloride (PVC), and fluoropolymers such as polytetrafluoroethylene (PTFE), tetrafluoroethylene-perfluoroalkylvinyl ether copolymers (PFA), tetrafluoroethylene-hexafluoropropylene copolymer (FEP), tetrafluoroethylene-ethylene copolymer (ETFE), polyvinylidene fluoride (PVDF), polychlorotrifluoroethylene (PCTFE), chrolotrifluoroethylene-ethylene copolymer (ECTFE), and polyvinylidene fluoride-hexafluoropropylene copolymer (PVDF-HFP). A plurality of polymers selected from among the above-described polymers can be mixed together with the proton conductive material for use in an electrolyte membrane.

It is preferred that the content of the proton conductive material be 30 to 90 parts by volume and the content of the non-proton conductive polymer be 70 to 10 parts by volume assuming that the total content of the proton conductive material and the non-proton conductive polymer is 100 parts by volume. When the content of the proton conductive material is less than 30 parts by volume, the distance between the particles forming the proton conductive material within the electrolyte membrane is too large or the probability of contact between the particles decreases. As a result, a proton conductivity enabling the fuel cell to operate at a sufficient output is not demonstrated. Further, where the content of the non-proton conductive polymer is less than 10 parts by volume, the film forming ability required to form the electrolyte membrane can be insufficient. It is further preferred that the content of the proton conductive material be 40 to 70 parts by volume and the content of the non-proton conductive polymer be 60 to 30 parts by volume, and it is most preferred that the content of the proton conductive material be 40 to 60 parts by volume and the content of the non-proton conductive polymer be 60 to 40 parts by volume.

With the preferred method for manufacturing the electrolyte membrane, the non-proton conductive polymer is dissolved in an adequate solvent, then the proton conductive material is added, the components are monodispersed with an ultrasonic homogenizer, the solution is cast on a smooth surface such as a glass plate, and then drying is performed under a flow of inactive gas such as nitrogen or argon. When the solvent remains inside the film, high-temperature vacuum drying can be also performed. In this case, dimethylsulfoxide (DMSO), N-methylpyrrolidone (NMP), and dimethylacetamide (DMA), or mixtures of these organic solvents can be used as the solvent. Other methods that have been conventionally used can be also employed for manufacturing the electrolyte membrane. Main examples of such methods include a melt extrusion method and a doctor blade method.

In the electrolyte membrane for a fuel cell of such a configuration, in the proton conductive material contained in the electrolyte membrane, a very large number of proton conductive groups as the end groups of the electrolyte resin filled up into the cavities of the inorganic fine particles serving as outer shells of the proton conductive material are exposed from the through-holes being located on the surface of inorganic fine particles, thereby ensuring high proton conductivity. Furthermore, because the electrolyte resin is confined in inorganic fine particles of fixed particle size, no swelling or contraction of the proton conductive material occurs. Therefore, in the electrolyte membrane, dimensional changes caused by water and heat balance are inhibited. In addition, even when a state with a high flowability is assumed such that normally occurs where a large number of proton conductive groups are introduced into the electrolyte resin structure, because the electrolyte resin is retained in the cavities of inorganic fine particles according to the embodiment, both the shape retention ability and the proton conductivity of the proton conductive material can be increased. Furthermore, because a non-proton conductive polymer that demonstrates no water-induced swelling or contraction is used as a binder resin for film formation, dimensional changes of the electrolyte membrane according to the embodiment caused by water and heat balance are prevented. Because the non-proton conductive polymer is not limited to a specific polymer, the degree of freedom in polymer selection is high and a polymer of an appropriate type can be selected, thereby making it possible to obtain an optimum electrolyte membrane according to the application and object of fuel cell. Furthermore, by using the proton conductive material and the non-proton conductive polymer in adequate amounts, it is possible to ensure sufficient film forming ability for forming an electrolyte membrane, while maintaining a high proton conductivity that allows a fuel cell to operate at a sufficient output. In addition, because the inorganic fine particles serving as outer shells for the proton conductive material are from $SiO_2$, which is a chemically stable and rigid inorganic material, the shape can be retained, without contraction/expansion caused by water and heat balance. In addition, the proton conductive material having the above-described average particle size is adequate for use in an electrolyte membrane of adequate thickness and a sufficient amount of the electrolyte resin can be filled up into the inorganic fine particles.

A method for manufacturing a proton conductive material will be described below. In Synthesis Example 1, 0.10 g of microcapsules were dispersed as hollow inorganic fine particles having through-holes in the surface in 3 mL of ion-exchange water. To the solution obtained, a total of 1.54 g of 3-(trihydroxysilyl)-1-propanesulfonic acid solution (manufactured by Gelest) with a concentration of 30 wt %, was added as a monomer having a sulfonic acid group. Then heating and pressure reduction (100 mm Hg, 70° C., 2 h) were performed to fill up the two aforementioned monomers into the microcapsules. Water contained in the solution was then vacuum distilled off at normal temperature, and heat treatment at 80° C. was performed for 3 h to polymerize the monomer. Washing with ion-exchange water was thereafter performed three times, and vacuum drying (100° C., 6 h) was performed. As a result, a proton conductive material that was a white solid body was obtained in an amount of 0.36 g.

In Synthesis Example 2, 0.72 g of 3-mercaptopropyltrimethoxysilane (manufactured by Tokyo Kasei), which is a monomer having a precursor group of a sulfonic acid group, was added to 0.60 g of 3-(trihydroxysilyl)-1-propanesulfonic acid solution (manufactured by Gelest) with a concentration of 30 wt %, which is a monomer having a sulfonic acid group. Then, 0.10 g of microcapsules were added as hollow inorganic fine particles having through-holes in the surface. Then heating and pressure reduction (100 mm Hg, 70° C., 2 h) were performed to fill up the two aforementioned monomers into the microcapsules. Water contained in the solution was then vacuum distilled off at normal temperature and heating at 80° C. was performed for 3 h to polymerize the monomer. The sample obtained was dispersed in ion-exchange water, an appropriate amount of hydrogen peroxide was added, and the precursor groups were converted into the sulfonic acid groups under stirring for 5 days at 70° C. After the conversion, water was vacuum distilled off at normal temperature and vacuum drying was performed (100° C., 6 h). As a result, a proton conductive material that was a white solid body was obtained in an amount of 0.55 g.

The manufacture of an electrolyte membrane will be described below. A total of 0.10 g (50 parts by volume) of polyvinylidene fluoride-hexafluoropropylene copolymer (PVDF-HFP) was dissolved in 1.5 mL of dimethylacetamide (DMA) under nitrogen in a pear-shaped flask, and 0.10 g of the proton conductive material (50 parts by volume, average particle size 3 to 5 μm) synthesized in Synthesis Example 1 was added, followed by stirring for 1 day at room temperature under nitrogen. Upon completion of the stirring, an impeller was removed, stirring was performed using an ultrasonic homogenizer for 30 min, and the PVDF-HFP and proton conductive material were monodispersed in the solvent. The monodispersed solution was cast on a Teflon® laboratory dish and allowed to stay for 24 h at 60° C. under a nitrogen flow. As a result, a moist gel film was obtained. When drying was performed for 12 h at 120° C. under vacuum to remove the solvent remaining in the wet gel film, a transparent flexible electrolyte film (0.2 g) was obtained.

The evaluation of dimensional changes of the electrolyte membrane will be described below. A total of six electrolyte membranes that were manufactured by the above-described method and molded to a length of 10 mm, a width of 10 mm, and a thickness of 0.05 mm were prepared. A total of 6 Nafion® (manufactured by DuPont) membranes molded to the same size and shape as the electrolyte membranes were prepared. Three electrolyte membranes and three Nafion membranes were allowed to stay under Conditions 1 (80° C., in water), and three electrolyte membranes and three Nafion membranes were allowed to stay under Conditions 2 (40° C., under atmospheric pressure). In 30 min, the dimensions of each membrane (length in the surface direction and membrane thickness) were measured with a micrometer, and an average value (n=3) of membrane dimensions under Conditions 1 (in water) and Conditions 2 (dry state) were calculated for the electrolyte membranes and Nafion membranes. The difference between average values of dimensions for Conditions 1 and average values of dimensions for Conditions 2 were taken as dimensional changes, and values obtained by dividing the dimensional changes by the initial dimensions of the membranes before they were allowed to stay under Conditions 1 or Conditions 2 were taken as ratios of dimensional change.

TABLE 1

| | Electrolyte membrane according to the embodiment | Nafion membrane |
|---|---|---|
| Surface direction | 1.2% | 15% |
| Membrane thickness direction | 0.8% | 18% |

Table 1 shows the ratio of dimensional change (average value where n is 3) in the surface direction and membrane thickness direction of the electrolyte membrane for a fuel cell according to the foregoing embodiment as compared with those obtained for a Nafion membrane. The ratio of dimensional change of the electrolyte membrane according to the embodiment was about 1% for both the surface direction and the membrane thickness direction. On the other hand, the ratio of dimensional change of the Nafion membrane was up to almost 20%. This result clearly indicates that significant inhibition of dimensional changes could be attained according to the foregoing embodiment.

Figure 2:
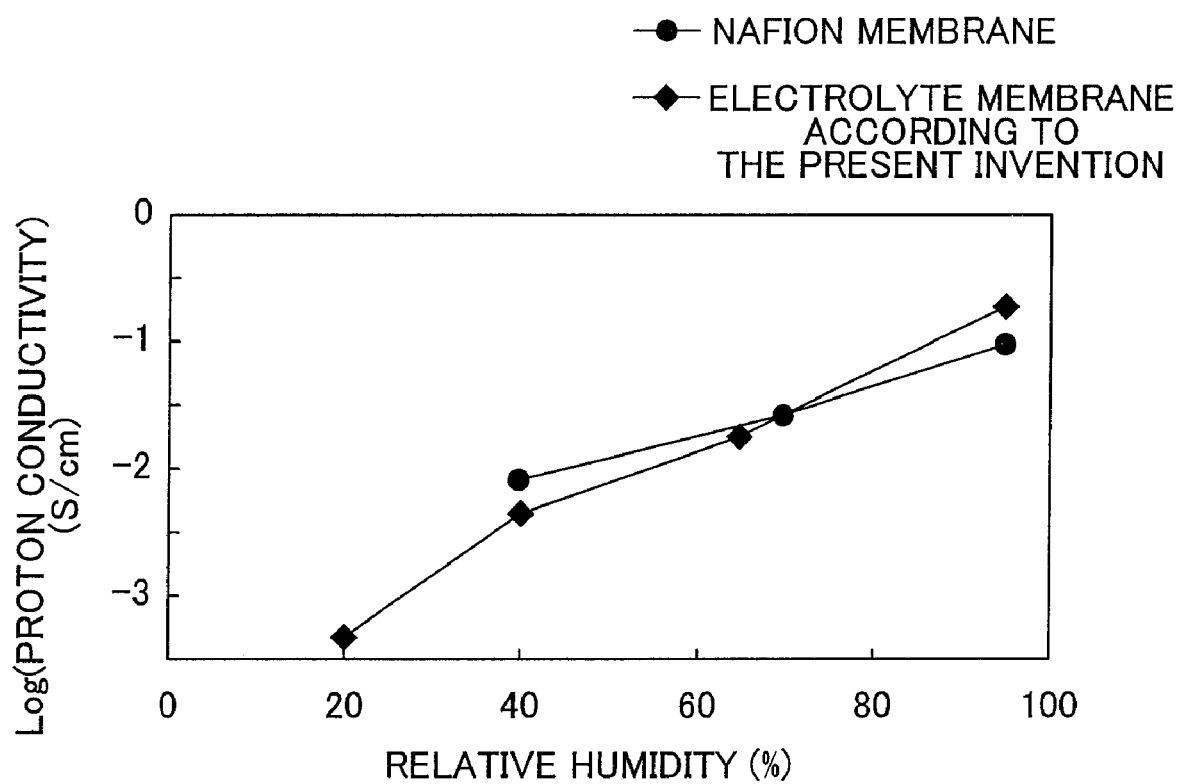
FIG. 2 is a graph illustrating a proton conductivity of the electrolyte membrane for a fuel cell according to the embodiment at different values of relative humidity in comparison with the results obtained for the Nafion membrane.

The evaluation of proton conductivity of the electrolyte membrane at different values of relative humidity will be descried below. The proton conductivity of the electrolyte membrane for a fuel cell according to the embodiment and Nafion membrane was evaluated by performing alternating current impedance measurements at a frequency of 10 kHz at different values of relative humidity. FIG. 2 is a graph showing the proton conductivity of the electrolyte membrane for a fuel cell according to the embodiment at different values of relative humidity in comparison with the results obtained for the Nafion membrane. The impedance measurements were performed after allowing the electrolyte membrane according to the embodiment and Nafion membrane to stay for 1 h at each relative humidity to reach a state of equilibrium. The results shown in FIG. 2 clearly indicate that at each relative humidity the electrolyte membrane for a fuel cell according to the embodiment has proton conductivity of the same order as that of the Nafion membranes that have been conventionally used and demonstrates sufficient proton conductivity when used as an electrolyte membrane for a fuel cell.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the claimed invention.

What is claimed is:

1. An electrolyte membrane for a fuel cell, comprising:
a proton conductive material comprising hollow inorganic fine particles in the form of capsules having through-holes on the surface of the hollow inorganic fine particles, wherein the hollow inorganic fine particles are filled with an electrolyte resin and wherein each of the capsules has an internal cavity and an external shell with the through-holes penetrating said external shell and wherein the electrolyte resin is in the internal cavity and the through-holes; and
a non-proton conductive polymer.

2. The electrolyte membrane for a fuel cell according to claim 1, wherein a content of the proton conductive material is 30 to 90 parts by volume while a content of the non-proton conductive polymer is 70 to 10 parts by volume assuming that the total content of the proton conductive material and the non-proton conductive polymer is 100 parts by volume.

3. The electrolyte membrane for a fuel cell according to claim 2, wherein the content of the proton conductive material is 40 to 70 parts by volume while the content of the non-proton conductive polymer is 60 to 30 parts by volume.

4. The electrolyte membrane for a fuel cell according to claim 3, wherein the content of the proton conductive material is 40 to 60 parts by volume while the content of the non-proton conductive polymer is 60 to 40 parts by volume.

5. The electrolyte membrane for a fuel cell according to claim 1, wherein the electrolyte resin being located within the inorganic fine particles has a Si—O skeleton.

6. The electrolyte membrane for a fuel cell according to claim 5, wherein the electrolyte resin being located within the inorganic fine particles is a polymer in which a Si—O skeleton is formed by polymerization of a monomer.

7. The electrolyte membrane for a fuel cell according to claim 6, wherein the monomer is a hydrocarbonoxysilane compound.

8. The electrolyte membrane for a fuel cell according to claim 6, wherein the monomer is a silanol compound.

9. The electrolyte membrane for a fuel cell according to claim 1, wherein the inorganic fine particles are $SiO_2$.

10. The electrolyte membrane for a fuel cell according to claim 1, wherein the inorganic fine particles are silsesquioxane.

11. The electrolyte membrane for a fuel cell according to claim 1, wherein the inorganic fine particles are zeolite.

12. The electrolyte membrane for a fuel cell according to claim 1, wherein the proton conductive material has an ion exchange capacity greater than the inorganic fine particles.

13. The electrolyte membrane for a fuel cell according to claim 1, wherein the ion exchange capacity of the proton conductive material is equal to or greater than 0.5 milliequivalent per gram.

14. The electrolyte membrane for a fuel cell according to claim 1, wherein an average particle size of the proton conductive material is 0.05 to 10 μm.

15. The electrolyte membrane for a fuel cell according to claim 1, wherein the non-proton conductive polymer is a hydrocarbon-based polymer.

16. The electrolyte membrane for a fuel cell according to claim 1, wherein the non-proton conductive polymer is a fluoropolymer.

* * * * *

UNITED STATES PATENT AND TRADEMARK OFFICE
CERTIFICATE OF CORRECTION

| | |
|---|---|
| PATENT NO. | : 7,745,061 B2 |
| APPLICATION NO. | : 12/265828 |
| DATED | : June 29, 2010 |
| INVENTOR(S) | : Tatsuo Fujinami et al. |

It is certified that error appears in the above-identified patent and that said Letters Patent is hereby corrected as shown below:

| Column | Line | |
|---|---|---|
| 1 | 9 | Change "dereference" to --reference--. |
| 7 | 4 | After "5%" insert --of--. |
| 7 | 28 | Change "chrolotrifluoroethylene-ethylene" to --chlorotrifluoroethylene-ethylene--. |

Signed and Sealed this
Eighteenth Day of January, 2011

David J. Kappos
*Director of the United States Patent and Trademark Office*